(12) United States Patent
Drumm et al.

(10) Patent No.: US 10,391,994 B2
(45) Date of Patent: Aug. 27, 2019

(54) BRAKE SYSTEM FOR MOTOR VEHICLES

(71) Applicant: Continental Teves AG & Co. oHG, Frankfurt (DE)

(72) Inventors: Stefan Drumm, Saulheim (DE); Paul Linhoff, Neu-Anspach (DE); Marco Besier, Bad Schwalbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 40 days.

(21) Appl. No.: 15/695,077

(22) Filed: Sep. 5, 2017

(65) Prior Publication Data
US 2017/0361825 A1 Dec. 21, 2017

Related U.S. Application Data

(63) Continuation of application No. PCT/EP2016/054268, filed on Mar. 1, 2016.

(51) Int. Cl.
*B60T 13/66* (2006.01)
*B60T 13/74* (2006.01)
(Continued)

(52) U.S. Cl.
CPC ............ *B60T 13/745* (2013.01); *B60T 8/363* (2013.01); *B60T 8/4081* (2013.01);
(Continued)

(58) Field of Classification Search
CPC ....... B60T 13/66; B60T 13/745; B60T 13/746
See application file for complete search history.

(56) References Cited

U.S. PATENT DOCUMENTS 9,145,119 B2 * 9/2015 Biller .................... B60T 8/4081
9,205,821 B2 * 12/2015 Biller .................... B60T 8/4081
(Continued)

FOREIGN PATENT DOCUMENTS

CN 102248937 A 11/2011
DE 102012205861 A1 10/2012
(Continued)

OTHER PUBLICATIONS

International Search Report and Written Opinion dated May 6, 2016 from corresponding International Patent Application No. PCT/EP2016/054268.
(Continued)

*Primary Examiner* — Bradley T King

(57) ABSTRACT

A brake system for vehicles, comprising hydraulically actuatable wheel brakes, a first electrohydraulic brake control device, having an associated pressure-medium. The first brake control device comprises a first pressure-providing device for supplying the wheel brakes. An inlet valve and an outlet valve for setting wheel-specific brake pressures, and a wheel-specific output pressure connection connected to the pressure-medium reservoir by the outlet valves. A second electrohydraulic brake control device, comprises a second pressure-providing device with a first pump having a suction side and a pressure side for supplying a first wheel brake of the wheel brakes. The second brake control device is connected downstream of the first brake control device and the suction side of the first pump is connected to a first of the output pressure connections of the first brake control device. A check valve is connected in parallel with the outlet valve of the first output pressure connection.

13 Claims, 9 Drawing Sheets

(51) Int. Cl.
*B60T 8/36* (2006.01)
*B60T 8/40* (2006.01)
*B60T 13/14* (2006.01)
*B60T 13/16* (2006.01)
*B60T 13/68* (2006.01)

(52) U.S. Cl.
CPC .......... *B60T 13/142* (2013.01); *B60T 13/161* (2013.01); *B60T 13/686* (2013.01); *B60T 13/746* (2013.01); *B60T 2270/82* (2013.01)

(56) References Cited

U.S. PATENT DOCUMENTS

| | | | | |
|---|---|---|---|---|
| 9,827,960 | B2* | 11/2017 | Feigel | B60T 8/4081 |
| 2009/0033146 | A1* | 2/2009 | Rieth | B60T 8/3275 |
| | | | | 303/116.1 |
| 2009/0229931 | A1* | 9/2009 | Baumann | B60T 8/4081 |
| | | | | 188/72.2 |
| 2011/0285199 | A1 | 11/2011 | Ishida | |
| 2013/0211685 | A1 | 8/2013 | Ulrich et al. | |
| 2014/0110997 | A1* | 4/2014 | Biller | B60T 8/4081 |
| | | | | 303/9.62 |
| 2014/0152085 | A1* | 6/2014 | Biller | B60T 8/4081 |
| | | | | 303/10 |
| 2015/0307072 | A1* | 10/2015 | Strengert | B60T 8/3265 |
| | | | | 303/81 |
| 2016/0152223 | A1* | 6/2016 | Bauer | B60T 13/745 |
| | | | | 303/14 |
| 2016/0159332 | A1* | 6/2016 | Yang | B60T 13/142 |
| | | | | 303/15 |
| 2016/0297413 | A1* | 10/2016 | Alford | B60T 8/4081 |
| 2017/0129469 | A1* | 5/2017 | Besier | B60T 13/662 |

FOREIGN PATENT DOCUMENTS

| | | |
|---|---|---|
| DE | 102013214004 A1 | 1/2014 |
| DE | 102014220440 A1 | 7/2015 |
| DE | 102014225958 A1 | 6/2016 |
| KR | 1020130102064 A | 9/2013 |
| WO | 9307032 A1 | 4/1993 |
| WO | 2012150120 A1 | 11/2012 |
| WO | 2016012331 A1 | 1/2016 |
| WO | 2014184840 A1 | 2/2017 |

OTHER PUBLICATIONS

German Search Report dated Dec. 23, 2016 for corresponding German Patent Application No. 10 2016 203 111.2.
Korean Office Action dated Oct. 15, 2018 for corresponding Korean Patent Application No. 10-2017-7023814.

* cited by examiner a)

b)

c)

BRAKE SYSTEM FOR MOTOR VEHICLES

CROSS-REFERENCE TO RELATED APPLICATIONS

This application claims the benefit of PCT Application PCT/EP2016/054268, filed Mar. 1, 2016, which claims priority to German Application DE 10 2015 203 924.2, filed Mar. 3,2015, German Application 10 2015 204 156.5 filed Mar. 9, 2015 and German Application 10 2016 203 111.2 filed Feb. 2, 2016. The disclosures of the above applications are incorporated herein by reference.

TECHNICAL FIELD

The invention relates to a brake system for motor vehicles.

BACKGROUND

Hydraulic brake systems are common in motor vehicles. Brake systems are increasingly being used in which it is possible to carry out braking actions which are executed independently of a braking request by the driver using assistance systems with the aid of electrical or electronic means. Such braking actions which are controlled by electronic control devices are required for example for realizing adaptive cruise control functions or (emergency) brake assist functions.

Brake-by-wire brake systems are further known, which, in the event of a normal brake actuation by the driver, also detect the brake actuation electronically and implement the corresponding braking action in an electronically controlled manner without the driver thereby gaining direct mechanical or hydraulic access to the wheel brakes. In such systems, the availability of the brake system in terms of both the normal brake function and the wheel-specific brake-pressure regulating function is very important in terms of safety.

It is to be expected that, in the future, motor-vehicle brake systems will also be used, which are suitable for motor vehicles for automated driving. These brake systems essentially have to be electronically controllable systems or brake-by-wire systems. This means that a braking command can be made via electronic or electrical control signals by a computer system acting as a virtual driver and implemented by the brake system without any intervention on the part of the driver. For safety reasons, particularly in such combined systems, it is necessary to ensure sufficiently good availability of the normal brake function and also the externally controllable brake function with wheel-specific regulation.

WO 2012/150120 A1 describes a brake system for motor vehicles, which comprises four hydraulically actuable wheel brakes, a pressurizing-medium reservoir under atmospheric pressure and a first electrohydraulic brake control device, which comprises a master brake cylinder, an electrically controllable pressure-providing device, a pressure-regulating valve arrangement for adjusting wheel-specific brake pressures and a wheel-specific output pressure connection for each wheel brake.

The brake system further comprises a second electrohydraulic module having electrically controllable pumps and electrically actuable valves, which is arranged hydraulically upstream of the pressure-regulating valve arrangement of the first brake control device, wherein the suction sides of two pumps of the second electrohydraulic module are connected directly to the pressurizing-medium reservoir. This is disadvantageous in that, in addition to the first brake control device, the second module also has to be connected to the pressurizing-medium reservoir and in that the second module has to be connected to the first module with a further four hydraulic connections, which involves a high level of complexity even when the second module is arranged adjacent to the first brake control device and can result in a plurality of long connecting lines when the second module is arranged at a spacing from the first brake control device.

Moreover, in terms of the hydraulic-connection technology, to integrate the second module into the first braking device, it is necessary to provide additional connections for the second module upstream of the pressure-regulating valve arrangement or upstream of the isolation valves of the first brake control device. This addition of a plurality of hydraulic connections involves complex intervention in the hydraulic component arrangement of the first brake control device in such a way that a corresponding mechanical adaptation thereof is not possible. It is instead necessary to produce a further, structurally different variant which is prepared for connecting the second module.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A brake system for motor vehicles is provided, which is suitable for vehicles having an autopilot driving function (e.g. for highly automated or autonomously driven motor vehicles). Furthermore, reducing the number of hydraulic connecting lines and/or the number of hydraulic connections at the first electrohydraulic brake control device, thereby simplifying the construction of the brake system.

The idea is such that, in a brake system for motor vehicles having hydraulically actuable wheel brakes of a first electrohydraulic brake control device having, amongst other things, an associated pressurizing-medium reservoir and wheel-specific outlet valves and output pressure connections, wherein the output pressure connections are connected to the pressurizing-medium reservoir via the outlet valves. A second electrohydraulic brake control device is hydraulically connected downstream, which comprises a second electrically controllable pressure-providing device having at least a first pump having a suction side and a delivery side for supplying at least a first wheel brake of the hydraulically actuable wheel brakes. The suction side of the first pump of the second electrohydraulic brake control device is connected here to a first output pressure connection of the output pressure connections of the first electrohydraulic brake control device, wherein a non-return valve which opens in the direction of the first output pressure connection is connected in parallel with the outlet valve associated with the first output pressure connection.

The second brake control device can be optionally added to the first brake control device to enable highly automated driving or autonomous driving (autopilot driving function). Vehicles from series in which some are equipped with an autopilot driving function and some are without an autopilot driving function can therefore always be fitted with the same first brake control device, wherein the second brake control device can simply be additionally integrated in vehicles which are capable of autopilot. The second brake control device can be simply connected to the corresponding (first)

output pressure connection or the corresponding output pressure connections. The respective wheel brakes are then connected to the second brake control device. In other words, the second brake control device is inserted between the first brake control device and the wheel brakes. In this case, additional hydraulic connections are not required at the first brake control device.

For the (first) suction path, or suction paths, of the second electrically controllable pressure-providing device, when pressurizing medium is drawn in by means of the second brake control device, a relatively unimpeded volumetric suction flow from the pressurizing-medium reservoir of the first brake control device to the second pressure-providing device of the second brake control device is enabled as a result of the parallel-connected non-return valve, which suction flow is not throttled by flowing through a (solenoid) valve.

The hydraulically actuable wheel breaks are at least hydraulically actuable, i.e. individual wheel brakes or all of the wheel brakes can be additionally designed to be electrically actuable, e.g. electromechanically actuable.

The first electrohydraulic brake control device, or the first electrically controllable pressure-providing device thereof, is constructed for supplying each of the hydraulically actuable wheel brakes.

The second electrohydraulic brake control device or the second electrically controllable pressure-providing device is constructed for supplying at least the first wheel brake.

Each of the output pressure connections of the first electrohydraulic brake control device can be connected to the pressurizing-medium reservoir by electrically activating the associated outlet valve for the purpose of permitting the outflow of pressurizing medium to the pressurizing-medium reservoir.

The suction side of the first pump is connected to the first output pressure connection of the output pressure connections of the first electrohydraulic brake control device directly, e.g. without an interconnected valve, or in an isolatable manner, e.g. via a valve.

To supply the first wheel brake, the delivery side of the first pump is connected at least to the first wheel brake.

The second brake control device may comprise at least the first pump, wherein a non-return valve, in particular precisely one non-return valve, is provided for the pump, in particular for each pump, which non-return valve is arranged in parallel with an outlet valve of the first brake control device and connects a suction side of the pump to the pressurizing-medium reservoir. The non-return valve here is designed to open in the direction of the associated output pressure connection or in the direction of the second brake control device.

The first brake control device and/or the second brake control device is/are constructed in such a way that the second brake control device can draw pressurizing medium from the pressurizing-medium reservoir exclusively through the first brake control device, i.e. in particular through at least one of the output pressure connections.

A non-return valve, which opens in the direction of the associated output pressure connection and through the associated output pressure connection of which pressurizing medium can be, or shall be, drawn and/or for the wheel brake of which the second brake control device comprises a pump, is connected in parallel with that, in particular each, outlet valve of the first brake control device.

According to a further development, the second pressure-providing device furthermore comprises a second pump having a suction side and a delivery side for supplying at least a second wheel brake of the hydraulically actuable wheel brakes, wherein the suction side of the second pump is connected to a second output pressure connection of the output pressure connections of the first electrohydraulic brake control device (e.g. directly or in an isolatable manner by means of a valve). A non-return valve which opens in the direction of the second output pressure connection is connected in parallel here with the outlet valve associated with the second output pressure connection. The second pressure-providing device can therefore supply pressure to at least two wheel brakes and comprises at least two suction paths via which pressurizing medium can be drawn from the pressurizing-medium reservoir in a relatively unhindered manner.

The first and the second wheel brake are associated with a front axle of the motor vehicle. Therefore, in the event of a failure of the first pressure-providing device, sufficient brake pressure can be built up by means of the second pressure-providing device, at least for the front wheels, which, during a braking action, can generally offset higher braking forces than the rear wheels.

The second electrohydraulic brake control device may be constructed to regulate the brake pressures of the wheel brakes of the front axle on the basis of the wheel-speed information of all wheels of the motor vehicle, the input-pressure information of the second electrohydraulic brake control device and an electronic braking request. The input-pressure information is detected via a pressure sensor of the second brake control device. The input-pressure information represents a braking request by the driver. The electronic braking request is provided by an autopilot function. The electronic braking request is supplied or provided to the second electronic control and regulating unit via a communication connection.

The wheels of the rear axle are designed with electrically or electromechanically actuable wheel brakes in addition to the hydraulic wheel brake, wherein the second electrohydraulic brake control device is constructed for electrically actuating the electric or electromechanical wheel brakes. The wheels of the rear axle are designed with electric parking brakes. Alternatively, the wheels of the rear axle are designed with combined brakes, which are both hydraulically and electrically controllable.

According to a first embodiment of the brake system according, the second electrohydraulic brake control device does not have a pump for a third wheel brake and a fourth wheel brake of the hydraulically actuable wheel brakes, wherein the third and the fourth wheel brake are associated with a rear axle of the motor vehicle. It is thus possible for the second brake control device to be manufactured more economically. The third and the fourth wheel brake are then each hydraulically connected directly, in particular without the interconnection of a valve, to the associated output pressure connection of the first brake control device. The hydraulic connection here between the wheel brake and the output pressure connection can extend through the second brake control device (i.e. the second brake control device is connected downstream of the first brake control device for all output pressure connections) or the hydraulic connection between the wheel brake and the output pressure connection can extend outside the second brake control device (i.e. the second brake control device is connected downstream of the first brake control device for the first and second output pressure connection).

The third and the fourth wheel brake are additionally designed to be electrically or electromechanically actuable, with an electric parking brake. The second electrohydraulic brake control device here is constructed for electrical actuation of the third and fourth wheel brake. Therefore, the second brake control device can actuate the first and second wheel brake hydraulically and the third and fourth wheel brake electrically/electromechanically, so that a braking force can be built up at four wheel brakes, even if the first brake control device has failed.

The second electrohydraulic brake control device comprises a respective low-pressure accumulator for the first and the second pump, wherein the suction side of the pump is connected to the low-pressure accumulator via a non-return valve which opens in the direction of the suction side. The pump can therefore also draw pressurizing medium from the low-pressure accumulator.

The second electrohydraulic brake control device furthermore comprises a respective discharge valve for the first and the second pump, which is designed to be normally closed, wherein the wheel brake associated with the pump can be connected to the low-pressure accumulator via the discharge valve. A pressurizing-medium volume to be discharged from the wheel brake can therefore be received by the low-pressure accumulator.

According to a further development, the second electrohydraulic brake control device comprises a respective connecting valve for the first and the second pump, which is designed to be normally closed and via which the suction side of the pump can be connected to the associated output pressure connection of the first brake control device.

According to a second embodiment of the brake system, the second pressure-providing device comprises a third pump having a suction side and a delivery side for supplying a third wheel brake of the hydraulically actuable wheel brakes and a fourth pump having a suction side and a delivery side for supplying a fourth wheel brake of the hydraulically actuable wheel brakes, wherein the suction side of the third pump is connected to a third output pressure connection of the output pressure connections of the first electrohydraulic brake control device and the suction side of the fourth pump is connected to a fourth output pressure connection of the output pressure connections of the first electrohydraulic brake control device, wherein a respective non-return valve which opens in the direction of the corresponding output pressure connection is connected in parallel with the outlet valve associated with the third output pressure connection and the outlet valve associated with the fourth output pressure connection. The second pressure-providing device can therefore supply pressure to four wheel brakes and comprises four suction paths via which pressurizing medium can be drawn from the pressurizing-medium reservoir in a relatively unhindered manner.

According to a third embodiment of the brake system, the delivery side of the first pump is connected to the first wheel brake and a third wheel brake of the hydraulically actuable wheel brakes and the delivery side of the second pump is connected to the second wheel brake and a fourth wheel brake of the hydraulically actuable wheel brakes. Therefore, when only two pumps are used, four wheel brakes can still be hydraulically actuated by the second brake control device.

For the first and the second wheel brake, a respective valve, which is designed to be normally open and analog controllable, is arranged between the respective pump delivery side and wheel brake and, for the third and the fourth wheel brake, a respective valve, which is designed to be normally closed, is arranged between the respective pump delivery side and wheel brake. The first and the second wheel brake are associated with a rear axle and the third and the fourth wheel brake are associated with a front axle of the motor vehicle. Therefore, with only two pumps, four wheel brakes can be supplied with hydraulic pressures which are individually adjustable via the valves.

For the parallel-connected non-return valve or for each of the parallel-connected non-return valves, the non-return valve is integrated in the valve core of the corresponding outlet valve. Therefore, it is not necessary to create bores or channels for the non-return valves in the valve block of the first brake control device.

According to a further development, to isolate brake circuits, the outlet valves of the first electrohydraulic brake control device are connected to chambers of the pressurizing-medium reservoir via at least two mutually independent return lines.

One of the return lines is connected to two of the outlet valves in each case, wherein the hydraulically actuable wheel brakes belonging to the two outlet valves are connected to the same pressure chamber of a tandem master brake cylinder of the first electrohydraulic brake control device. Therefore, during operation of the second brake control device, a leak in one brake circuit connected to one of the pressure chambers of the tandem master brake cylinder does not automatically result in a loss of pressurizing medium in the other brake circuit of the tandem master brake cylinder.

The second electrohydraulic brake control device is designed as a structural unit in the form of a brake control device having an electronic control and regulating unit and a hydraulic control and regulating unit. The electronic control and regulating unit here is constructed to control the second pressure-providing device. The second brake control device can therefore simply be optionally added to a first brake control device (modular design principle).

In other words, for at least one group of hydraulically actuable wheel brakes (at least the first wheel brake), the second electrohydraulic brake control device is connected in series between the associated output pressure connections of the first brake control device and the wheel brake(s) of the group of wheel brakes. For the outlet valves of those wheel brakes which belong to the group of wheel brakes and for which a pump is provided in the second brake control device, a respective non-return valve is provided, which is connected in parallel with the outlet valve and opens in the direction of the output pressure connection. The group of wheel brakes can comprise one or more or all of the hydraulically actuable wheel brakes. The group comprises two or four wheel brakes. In the case of two wheel brakes, these are the wheel brakes of a front axle of the motor vehicle.

The second brake control device comprises at least one pump, wherein a non-return valve, in particular precisely one non-return valve, which is arranged parallel to an outlet valve of the first brake control device, is provided for each pump of the second brake control device, in particular in the first brake control device.

For each wheel brake of the group of wheel brakes, the second pressure-providing device comprises a pump whereof the suction side is connected to an output pressure connection of the first brake control device, in particularly directly or via a valve.

The wheel brakes which do not belong to the group of wheel brakes to which hydraulic pressure can be applied by means of the second brake control device, or for which the second brake control device does not comprise a pump, are designed to be both hydraulically actuable and also electrically or electromechanically actuable.

The second electrohydraulic brake control device is constructed for electrical actuation of the electrically or electromechanically actuable wheel brakes. The wheel brakes of the rear axle of the motor vehicle are particularly electrically or electromechanically actuable. The wheel brakes are actuable by means of an electric parking brake function. Therefore, in the event of a failure of the first brake control device, a braking torque can still be built up in an electrically controlled manner at the corresponding wheel brakes by the second brake control device.

The second pressure-providing device of the second brake control device comprises at least one pump for each of the wheel brakes provided for pressure control by means of the second brake control device, wherein the suction side of the pump is connected in each case to the corresponding output pressure connection of the first brake control device. Corresponding pumps are already essentially widely used in conventional brake systems based on the recirculating principle, and can therefore be manufactured economically.

The second pressure-providing device is designed as a combination of an single electric motor with a number of pumps, wherein the number of pumps corresponds to the number of wheel brakes provided for pressure control by means of the second brake control device.

The second brake control device is provided for applying pressure to at least the wheel brakes of a front axle of the motor vehicle. The group of wheel brakes is formed by the hydraulically actuable wheel brakes of a front axle of the motor vehicle. The wheel brakes of a rear axle of the motor vehicle are then designed to be both hydraulically actuable and electromechanically actuable.

Alternatively, the second brake control device is constructed for applying pressure to all wheel brakes, i.e. that the group of wheel brakes is formed by all wheel brakes.

The second brake control device comprises a wheel-specific input pressure connection and a wheel-specific output pressure connection for each of the wheel brakes of the group of wheel brakes. In this case, the input pressure connection of the second brake control device is respectively connected to the output pressure connection of the first brake control device which is associated with the wheel brake, and the output pressure connection of the second brake control device is connected to the wheel brake.

According to an embodiment of the brake system, the first brake control device is designed as a structural unit in the form of a brake control device having a first electronic control and regulating unit and a first hydraulic control and regulating unit, wherein the first electronic control and regulating unit is constructed for controlling the inlet and outlet valves and the first pressure-providing device.

The brake system is configured in such a way that the second brake control device becomes active in the event of failures of the first brake control device. Failure means that the first brake control device does not build up any pressure or only builds up insufficient pressure. In this case, the second brake control device takes over the actuation of at least some of the wheel brakes.

To increase the availability of the brake system, the brake system comprises at least two mutually independent electrical energy sources. Particularly, the first brake control device is supplied with electrical energy by a first electrical energy source and the second brake control device is supplied with electrical energy by a second electrical energy source.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
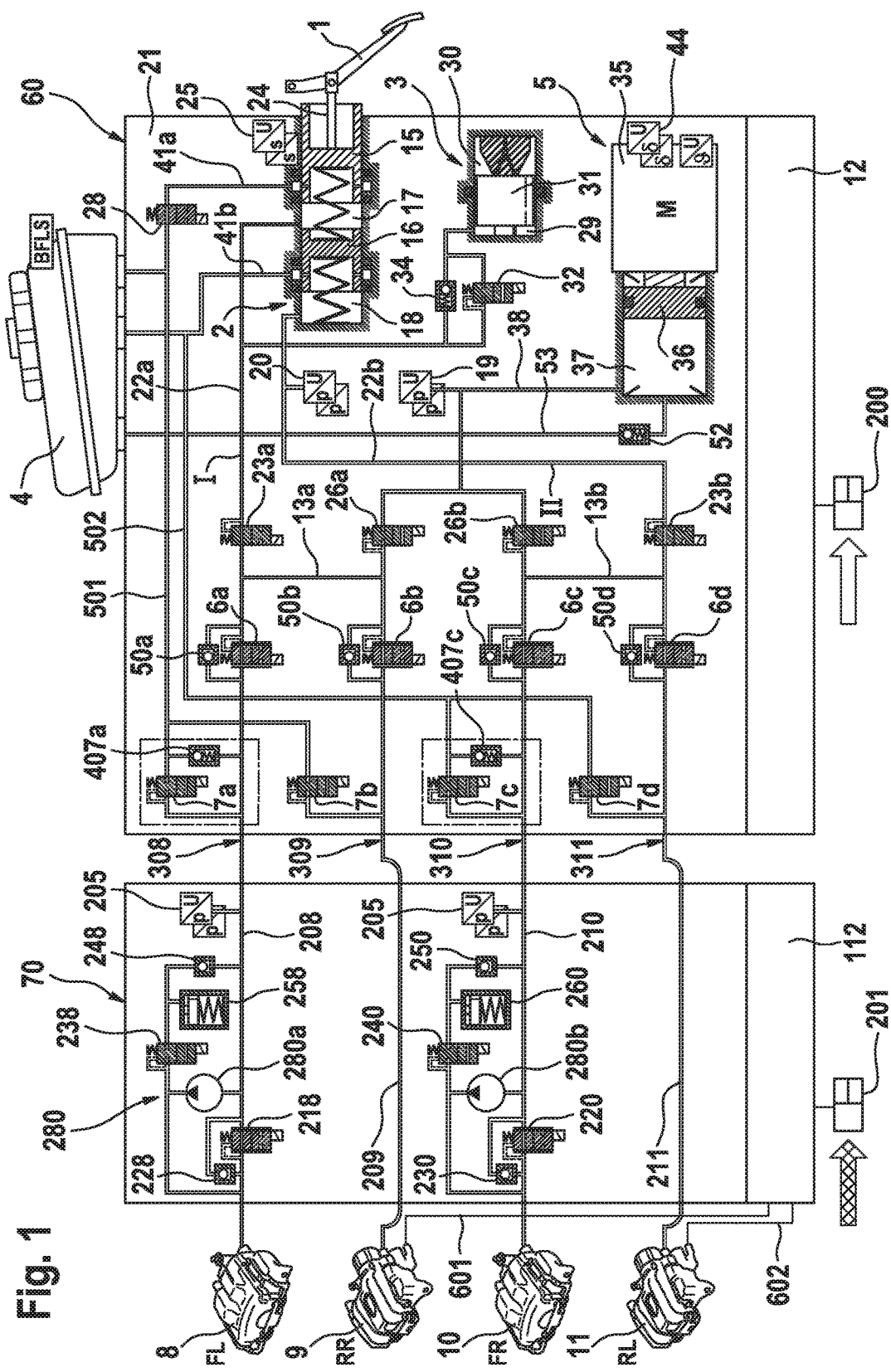
FIG. 1 a first exemplary embodiment of a brake system according to the invention.

FIG. 1 shows a first exemplary embodiment of a brake system according to the invention. The brake system substantially comprises a master brake cylinder 2 which is actuable by means of an actuating or brake pedal 1, a simulation device 3 cooperating with the master brake cylinder 2, a pressurizing-medium reservoir 4 which is under atmospheric pressure and is associated with the master brake cylinder 2, a first electrically controllable pressure-providing device 5, which is formed by way of example by a cylinder/piston arrangement having a hydraulic pressure chamber 37, whereof the piston 36 is displaceable by an electromechanical actuator, an electrically controllable pressure modulation device having an inlet and an outlet valve 6a-6d, 7a-7d for each wheel brake 8-11 for adjusting wheel-specific braking pressures, a first electronic control and regulating unit 12, a second electrically controllable pressure-providing device 280 and a second electronic control and regulating unit 112.

The master brake cylinder 2, the simulation device 3, the first pressure-providing device 5, the valves 23a, 23b, 26a, 26b (which are explained in more detail below) and the inlet and outlet valves 6a-6d, 7a-7d are part of a first brake control device 60. The first electronic control and regulating unit 12 is associated with the first brake control device 60.

The second pressure-providing device 280 and further valves are part of a second brake control device 70. The second electronic control and regulating unit 112 is associated with the second brake control device 70.

The pressure modulation device (not described in more detail) of the first brake control device 60 comprises, by way of example, for each hydraulically actuable wheel brake 8, 9, 10, 11 of a motor vehicle (not illustrated), an inlet valve 6a-6d and an outlet valve 7a, 7d, which are hydraulically interconnected in pairs via central connections. The respective central connection forms the wheel-specific output pressure connection 308, 309, 310, 311 of the first brake control device 60 for the corresponding wheel brake 8, 9, 10, 11.

By means of brake-circuit supply lines 13a, 13b, the input connections of the inlet valves 6a-6d are supplied with pressures which, in a brake-by-wire operating mode, are derived from a system pressure present in a system pressure line 38 which is connected to the pressure chamber 37 of the electrically controllable pressure-providing device 5. A respective non-return valve 50a-50d which opens to the brake-circuit supply lines 13a, 13b is connected in parallel with the inlet valve 6a-6d. In a fallback braking mode, the pressures of the pressure chambers 17, 18 of the master brake cylinder 2 can be applied to the brake-circuit supply lines 13a, 13b via hydraulic lines 22a, 22b. The output connections of the outlet valves 7a-7d are connected in pairs (brake-circuit-wise) to a respective chamber of the pressurizing-medium reservoir 4 via a separate return line 501, 502.

The master brake cylinder 2 has two pistons 15, 16 which are arranged in succession in a housing 21 and delimit hydraulic pressure chambers 17, 18. On the one hand, the pressure chambers 17, 18 are each in communication with a chamber of the pressurizing-medium reservoir 4 via radial bores formed in the piston 15, 16 and by corresponding pressure-equalizing lines 41a, 41b, wherein the connections may be blocked by a relative movement of the piston 17, 18 in the housing 21. On the other hand, the pressure chambers 17, 18 are in communication with the above-mentioned brake-circuit supply lines 13a, 13b by means of the hydraulic lines 22a, 22b.

A normally open diagnostic valve 28 is arranged in the pressure-equalizing line 41a.

The pressure chambers 17, 18 receive restoring springs (not described in more detail), which position the pistons 15, 16 in a starting position when the master brake cylinder 2 is not actuated. A piston rod 24 couples the pivotal movement of the brake pedal 1, resulting from a pedal actuation, to the translatory movement of the first (master brake cylinder) piston 15, whereof the actuation travel is detected by a travel sensor 25, which is designed with redundancy. The corresponding piston travel signal is thus a measure of the brake pedal actuation angle. It represents a braking request by the driver of the vehicle.

Arranged in the line portions 22a, 22b which are connected to the pressure chambers 17, 18 is a respective isolation valve 23a, 23b which is constructed as an electrically actuable, normally open, 2/2 way valve. The hydraulic connection between the pressure chambers 17, 18 of the master brake cylinder 2 and the brake-circuit supply lines 13a, 13b can be blocked by the isolation valves 23a, 23b.

A pressure sensor 20 connected to the line portion 22b detects the pressure which has built up in the pressure chamber 18 through a displacement of the second piston 16.

The simulation device 3 can be hydraulically coupled to the master brake cylinder 2 and, by way of example, substantially comprises a simulator chamber 29, a simulator spring chamber 30 and a simulator piston 31 isolating the two chambers 29, 30 from one another. The simulator piston 31 is supported against the housing 21 by a resilient element (e.g. a spring) which is arranged in the simulator spring chamber 30 and is pre-tensioned. The simulator chamber 29 can be connected to the first pressure chamber 17 of the master brake cylinder 2 by means of an electrically actuable simulator valve 32. When prompted by a pedal movement and when the simulator valve 32 is open, pressurizing medium flows from the master-brake-cylinder pressure chamber 17 into the simulator chamber 29. The simulator piston 31 is thereby displaced and the restoring force of the resilient element brings about a hydraulic pressure increase. This hydraulic pressure also acts in the pressure chamber 17 of the master brake cylinder 2 and generates a substantial proportion of the pedal force by acting on the piston 15. The brake pedal characteristic, i.e. the relation between the restoring force of the brake pedal and the brake pedal travel, is therefore substantially determined by the mechanical properties of the resilient element, whilst a damping of the pedal actuation is realized by the flow characteristics of the hydraulic transfer of the master cylinder piston movement to the simulator piston movement. A non-return valve 34 which is arranged hydraulically anti-parallel to the simulator valve 32 here enables a largely unhindered return flow of the pressurizing medium from the simulator chamber 29 to the master-brake-cylinder pressure chamber 17 independently of the switching status of the simulator valve 32. Other embodiments of the simulation device 3 and connections of the simulation device 3 to the master brake cylinder 2 are conceivable.

The electrically controllable pressure-providing device 5 is constructed as a hydraulic cylinder/piston arrangement or a single-circuit electrohydraulic actuator, whereof the piston 36, which delimits the pressure chamber 37, can be actuated by an electric motor 35 (indicated schematically) with the interconnection of a rotation/translation gear (likewise illustrated schematically). A rotor position sensor (merely indicated schematically), which serves to detect the rotor position of the electric motor 35, is denoted by the reference sign 44. A temperature sensor for sensing the temperature of the motor winding can also be used.

The actuator pressure, which is generated by the force action of the piston 36 on the pressurizing medium enclosed in the pressure chamber 37, is fed into the system pressure line 38 and detected by a pressure sensor 19 which is designed with redundancy. When the sequence valves 26a, 26b are opened (and the inlet valves 6a-6d are open), the pressurizing medium arrives at the output pressure connections 308-311 and is available for actuating the wheel brakes 8, 9, 10, 11. Through the forward and backward displacement of the piston 36, a build-up and decrease in the wheel-brake pressure for the wheel brakes 8, 9, 10, 11 is therefore effected by means of the first brake control device 60 (e.g. during a normal braking action in the brake-by-wire operating mode) when the sequence valves 26a, 26b are opened.

Unlike with a normal braking action, different wheel-specific wheel brake pressures are required during an ABS-regulated braking action. These are realized in that, with the electrically controllable pressure-providing device 5, a sufficiently high system pressure for all wheel brakes is provided, from which the required wheel brake pressures are derived individually with the aid of the inlet valves 6a-6d and the outlet valves 7a-7d. During this, pressurizing medium which is discharged via the outlet valves 7a-7d flows into the pressurizing-medium reservoir 4 so that the volumetric supply of pressurizing medium in the pressure chamber 37 decreases in the course of an ABS-regulated braking action. Before this volumetric supply is exhausted, it is replenished by a suction process adapted time-wise to the ABS regulating activities.

For suctioning pressurizing medium into the first pressure-providing device 5, e.g. after pressurizing medium has been discharged into the pressurizing-medium reservoir 4 via an outlet valve 7 during ABS-regulation, a hydraulic connecting line 53 is provided between the pressure chamber 37 of the first pressure-providing device 5 and the pressurizing-medium reservoir 4. By way of example, a non-return valve 52 which opens in the direction of the pressure chamber is provided in the connecting line 53. The first pressure-providing device 5 can thereby be re-charged by a simple backward movement of the piston 36.

The first electronic control and regulating unit serves to control the electrically actuable components, in particular the valves 6a-6d, 7a-7d, 23a, 23b, 26a, 26b, 28, 32 and the electric motor 35 of the pressure-providing device 5 of the first brake control device 60. The signals of the sensors 19, 20, 25 and 44 are likewise processed in the electronic control and regulating unit 12.

According to the exemplary embodiment of FIG. 1, to enable pressurizing medium to be drawn through the first brake control device 60, a respective non-return valve 407a or 407c, which opens in the direction of the output pressure connection 308 or 310, is connected in parallel with the outlet valves 7a and 7c.

Figure 9:
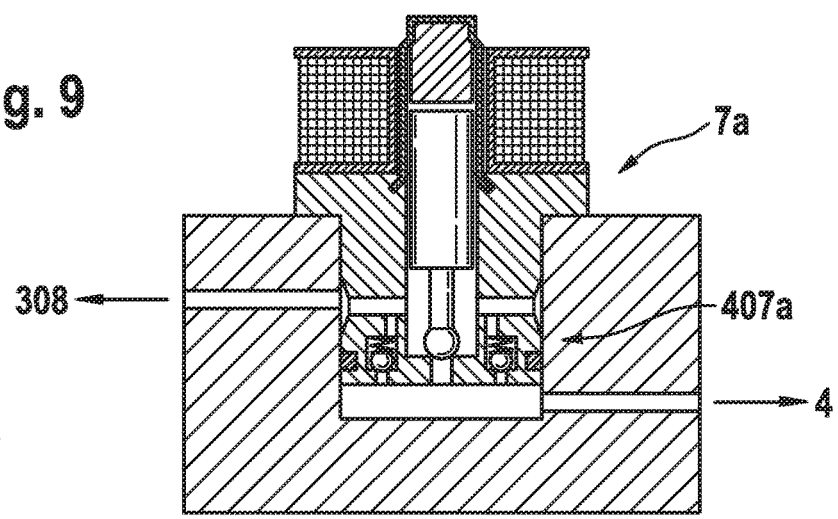
FIG. 9 exemplary embodiments of an outlet valve having a parallel-connected non-return valve or parallel-connected non-return valves.
Figure 9:
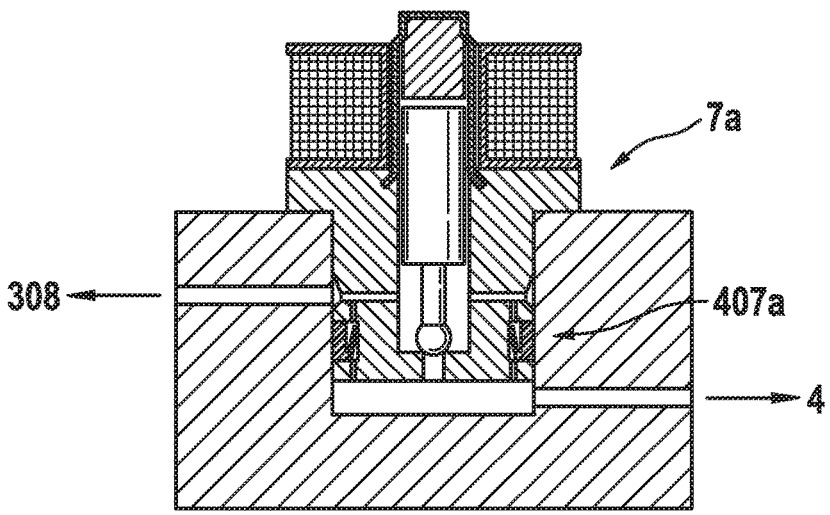
Figure 9:
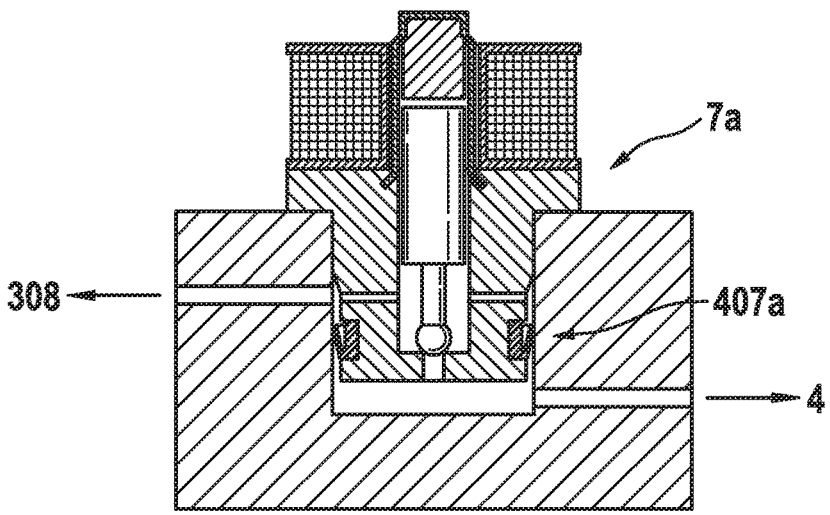

Three exemplary structural variant embodiments of a combination of an outlet valve with a hydraulically parallel-connected non-return valve are illustrated in FIG. 9 with reference to the example of the outlet valve 7a and the non-return valve 407a. The connection of the combination to the pressurizing-medium container 4 is illustrated here on the right and the connection to the output pressure connection 308 of the first brake control device 60 is illustrated on the left. The non-return valve illustrated in FIG. 9a comprises a ball, a ball seat and a spring. FIG. 9b shows the use of a sealing ring having a sealing lip cooperating with the valve shaft to illustrate the function of the non-return valve. FIG. 9c shows an outlet valve 7 having an elastomer sealing ring having a sealing lip which cooperates with the wall of the valve receiving bore to illustrate the function of the non-return valve.

By way of example, the second brake control device 70 is connected in series between the output pressure connections 308, 309, 310 311 of the first brake control device 60 and the wheel brakes 8, 9, 10, 11. Since the second brake control device 70 comprises only a hydraulic connecting line 209 or 211 (between the output pressure connection and the wheel brake) for the wheel brakes 9 and 11, and no "active" hydraulic components, in particular no pump or valve, the wheel brakes 9 and 11 can also be connected directly to the output pressure connections 309, 311 of the first brake control device, i.e. the second brake control device 70 can alternatively be hydraulically connected in series between (only) the output pressure connections 308 and 310 of the first brake control device 60 and the wheel brakes 8 and 10.

For each of the wheel brakes 8 and 10 to which pressure can also be applied by means of the second brake control device 70, the second brake control device 70 comprises a hydraulic connecting line 208 or 210 for the connection between the output pressure connection 308, 310 and the wheel brakes 8, 10, in which an electrically actuable isolation valve 218, 220 is arranged. The isolation valve 218, 220 is designed to be normally open. By way of example, the isolation valve 218, 220 is analog controllable. A non-return valve 228, 230 which opens in the direction of the wheel brake is connected in parallel with the isolation valve 218, 220.

The second brake control device 70 comprises a pump 280a, 280c for each of the wheel brakes 8 and 10. By way of example, the pumps are driven together by an electric motor (not illustrated).

The suction side of the pump 280a, 280c is connected to the associated output pressure connection 308, 310 of the first brake control device 60. The delivery side of the pump 280a, 280c is connected to the output pressure connection of the second brake control device 70, i.e. the wheel brake 8, 10.

By way of example, the delivery side of the pump 280a, 280c is connected to the output pressure connection 308, 310 (or the suction side of the pump) via a hydraulic connection in which an electrically actuable discharge valve 238, 240 and a non-return valve which opens in the direction of the output pressure connection 308, 310 is arranged. The discharge valve is designed to be normally closed.

Pressurizing medium can be discharged from the wheel brake 8, 10 into a low-pressure accumulator 258, 260 by means of the discharge valve 238, 240.

For each of the wheel brakes 8 and 10, the second brake control device 70 further comprises a pressure sensor 205, which detects the corresponding wheel-specific input pressure at the second brake control device 70 (corresponds to the pressure of the output pressure connection 308 or 310).

The second electronic control and regulating unit 112 serves to control the electrically actuable components of the second brake control device 70, in particular the valves 218, 220, 238, 240 and the second pressure-providing device 280. The signals of the sensors 205 are likewise processed in the second electronic control and regulating unit 112.

Since the second brake control device 70 of the exemplary brake system of FIG. 1 is not constructed for actively applying pressure to the wheel brakes 9 and 11, the wheel brakes 9, 11 are, by way of example, also designed to be electrically actuable, e.g. by means of an electric parking brake function. To this end, electrical control lines 601, 602 from the second electronic control and regulating unit 112 to the wheel brakes 9, 11 are provided, via which the second brake control device 70 can control the wheel brakes 9 and 11 in case the first brake control device 60 fails. In this case, pressure is applied to the wheel brakes 8, 10 by means of the second brake control device 70 and the wheel brakes 9, 11 are electrically actuated by the second brake control device 70.

Figure 2:
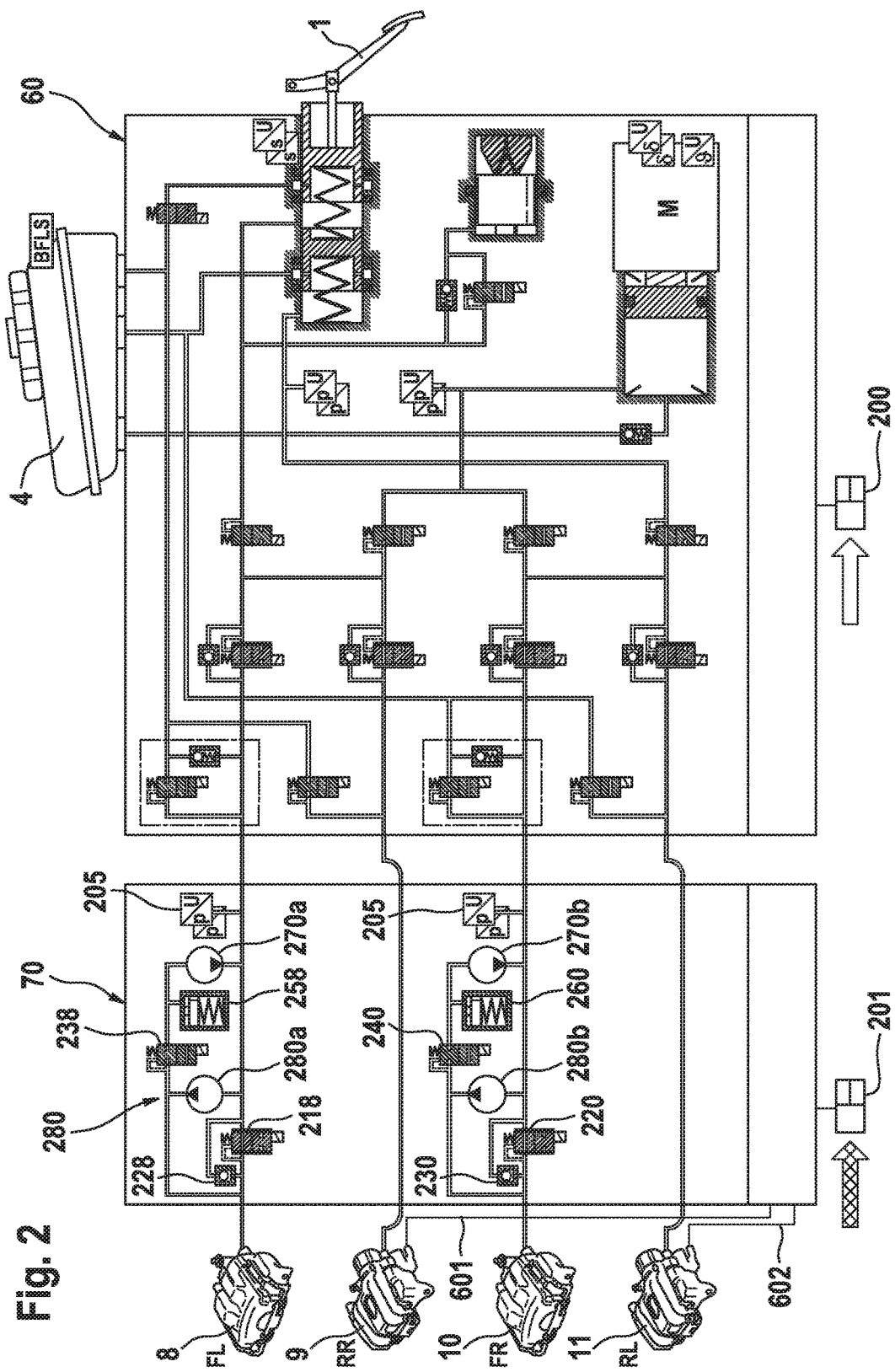
FIG. 2 a second exemplary embodiment of a brake system according to the invention.

A second exemplary embodiment of a brake system according to the invention is illustrated in FIG. 2. The first brake control device 60 of the second exemplary embodiment corresponds to that of the first exemplary embodiment of FIG. 1, which is why the reference signs of the corresponding components are not all denoted again individually in FIG. 2. The second brake control device 70 of the second exemplary embodiment corresponds to that of the first exemplary embodiment of FIG. 1, but additionally comprises a further pump 270a, 270b for each wheel brake 9 and 11, which is arranged in place of the non-return valve 248, 250 of the first exemplary embodiment. Pressurizing medium can be actively recirculated from the low-pressure accumulator 258, 260 by means of the pump 270a, 270b.

Figure 3:
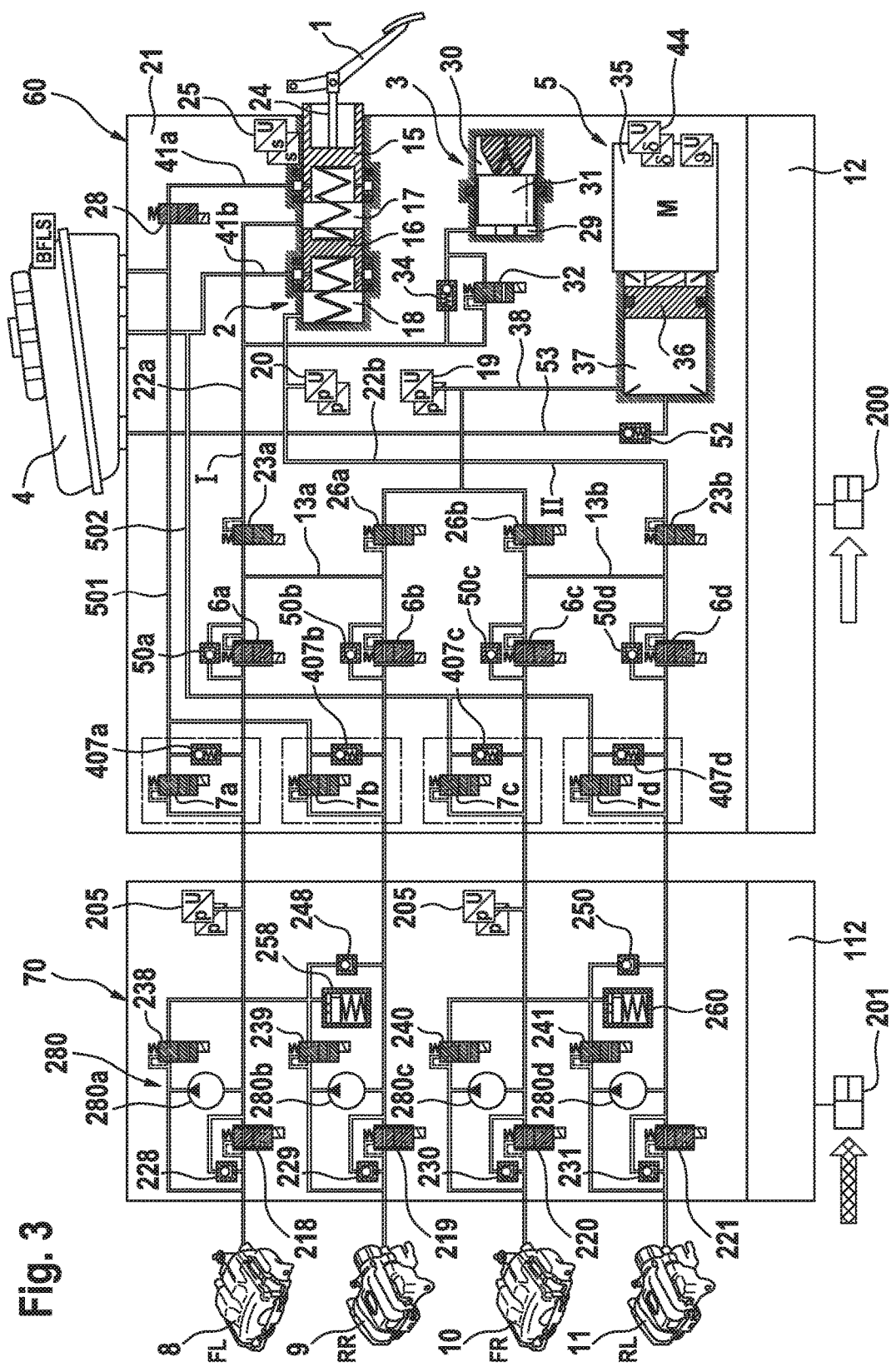
FIG. 3 a third exemplary embodiment of a brake system according to the invention.

A third exemplary embodiment of a brake system according to the invention is illustrated in FIG. 3. In contrast to the first brake control device of FIG. 1, the first brake control device 60 of the third exemplary embodiment comprises, for each outlet valve 7a-7d, a non-return valve 407a, 407d which is connected in parallel thereto. For each wheel brake 8-11, the second brake control device 70 furthermore comprises a proportional flow control valve 218-221 with a parallel-connected non-return valve 228-231, a pump 280a-280d and a discharge valve 238-241 corresponding to the first exemplary embodiment. A "common" low-pressure accumulator 258 or 260 and a "common" non-return valve 248 or 250 is associated in each case with two wheel brakes of a brake circuit I, II (i.e. wheel brakes 8, 9 and 10, 11).

Since the second brake control device 70 of the exemplary brake system of FIG. 3 is constructed for actively applying pressure to all wheel brakes 8-11, the wheel brakes 9, 11 do not need to be designed to be electrically actuable. It is correspondingly possible to omit the control lines 601, 602 according to the third exemplary embodiment of FIG. 1.

Figure 4:
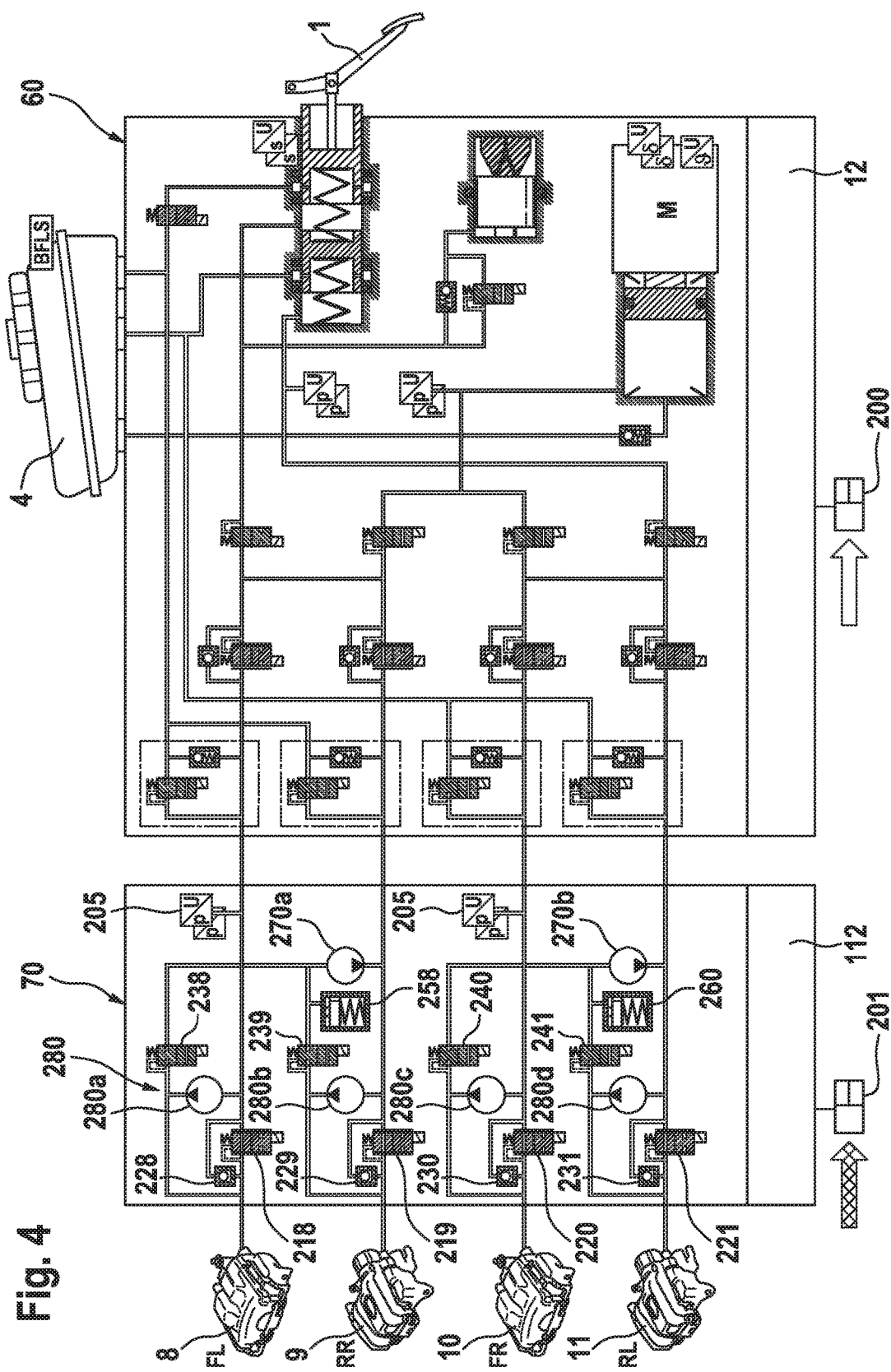
FIG. 4 a fourth exemplary embodiment of a brake system according to the invention.

A fourth exemplary embodiment of a brake system according to the invention is illustrated in FIG. 4. This largely corresponds to the third exemplary embodiment, wherein (analogously to FIG. 2) the second brake control device 70 additionally comprises a further pump 270a, 270b for each low-pressure accumulator, which is arranged in place of the non-return valve 248, 250 (of FIG. 1).

Figure 5:
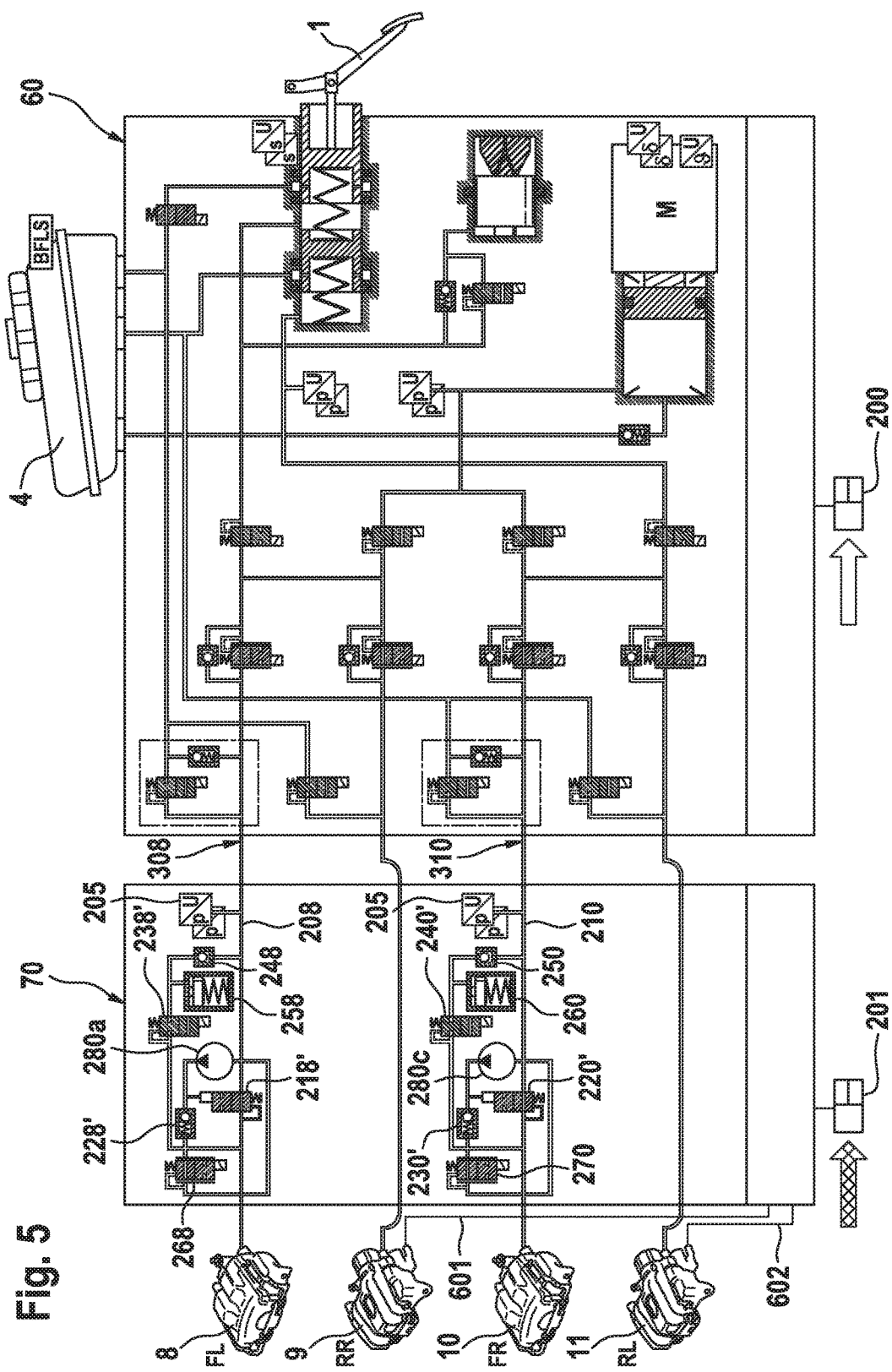
FIG. 5 a fifth exemplary embodiment of a brake system according to the invention.

A fifth exemplary embodiment of a brake system according to the invention is illustrated in FIG. 5. The first brake control device 60 corresponds to that of the first exemplary embodiment of FIG. 1, which is why individual reference signs have also been omitted here in FIG. 5. For the wheel brakes 8 and 10 to which pressure is applied by means of the second pressure-providing device 280, the exemplary second brake control device 70 comprises a hydraulic connecting line 208 or 210 for the connection between the output pressure connection 308, 310 and the wheel brake 8, 10, in which a hydraulically actuable isolation valve 218', 220' is arranged. The isolation valve 218', 220' is designed to be normally open. The second brake control device 70 comprises a pump 280a, 280c for each of the wheel brakes 8 and 10. By way of example, the pumps are driven together by an electric motor (not illustrated). The suction side of the pump 280a, 280c is connected to the associated output pressure connection 308, 310 of the first brake control device 60.

The delivery side of the pump 280a, 280c is connected to the output pressure connection of the second brake control device 70, i.e. the wheel brake 8, 10, via a non-return valve 228', 230' which opens in the direction of the wheel brake. The delivery side of the pump 280a, 280c is also connected to the control connection of the isolation valve 218', 220'.

By way of example, the delivery side of the pump 280a, 280c is connected to the output pressure connection 308, 310 (or the suction side of the pump) via the non-return valve 228', 230', an electrically actuable discharge valve 238', 240' and a non-return valve 248, 250 which opens in the direction of the output pressure connection 308, 310. The discharge valve 238', 240' is designed to be normally closed. Pressurizing medium can be discharged from the wheel brakes 8, 10 into a low-pressure accumulator 258, 260 by means of the discharge valve 238', 240'.

By way of example, the delivery side of the pump 280a, 280c is connected to its suction side via the non-return valve 228', 230' and an electrically actuable valve 268, 270. The valve 268, 270 is designed to be normally open. By way of example, the valve 268, 270 is analog controllable.

For each of the wheel brakes 8 and 10, the second brake control device 70 further comprises a pressure sensor 205 which detects the corresponding wheel-specific input pressure at the second brake control device 70 (corresponds to the pressure of the output pressure connection 308 or 310).

Since the second brake control device 70 of the exemplary brake system of FIG. 5 is not constructed for actively applying pressure to the wheel brakes 9 and 11, the wheel brakes 9, 11 are designed by way of example to also be electrically actuable, as is known per se, e.g. for realizing an electric parking brake function. To this end, electrical control lines 601, 602 from the second electronic control and regulating unit 112 to the wheel brakes 9, 11 are provided, via which the second brake control device 70 can control the wheel brakes 9 and 11 in case the first brake control device fails 60.

The exemplary second brake control device 70 has a lower flow resistance owing to the hydraulically actuable isolation valves 218', 220'. With electromagnetically actuated valves, it is necessary to ensure that the hydraulic cross-sections to be opened, throttled or blocked are small enough so that, at the prevailing pressures, they only generate hydraulic forces which are lower than the electrically generated magnetic force of the valve drive. It is possible to select larger hydraulic cross-sections for the exemplary hydraulically actuated valves 218', 220' since controlling them with the aid of the pump pressure enables greater valve positioning forces to be realized.

Figure 6:
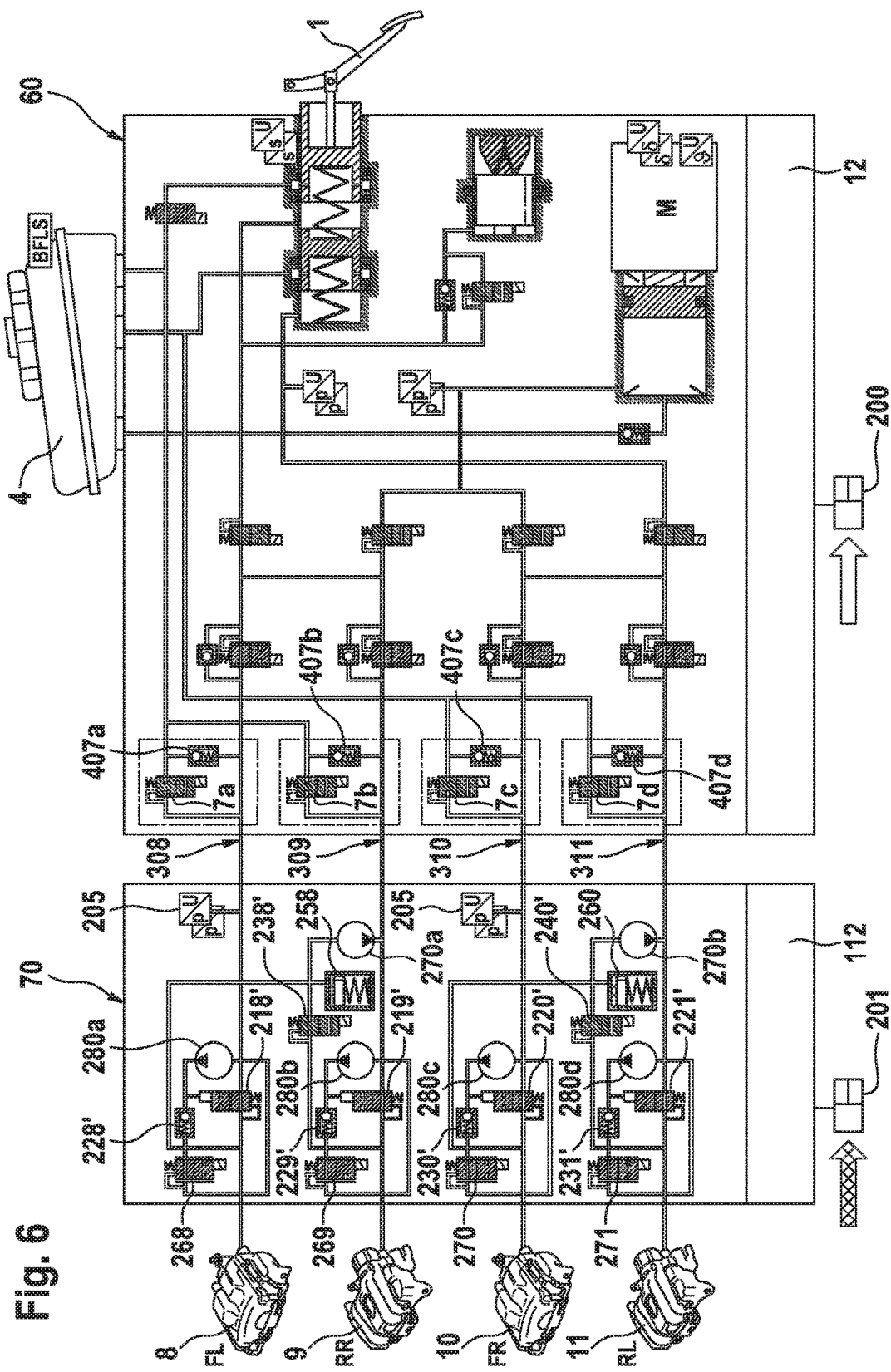
FIG. 6 a sixth exemplary embodiment of a brake system according to the invention.

A sixth exemplary embodiment of a brake system according to the invention is illustrated in FIG. 6. The first brake control device 60 corresponds to that of the third exemplary embodiment of FIG. 3 and comprises, for each outlet valve 7a-7d, a non-return valve 407a-407d connected in parallel therewith. For each wheel brake 8-11, the second brake control device 70 furthermore comprises a hydraulically actuable isolation valve 218'-221', a pump 280a-280d, a non-return valve 228'-231' and a valve 268-271 (analogously to the fifth exemplary embodiment). A respective "common" low-pressure accumulator 258 or 260 is associated here with the wheel brakes of a brake circuit I, II (i.e. wheel brakes 8, 9 and 10, 11). A further pump 270a or 270b is provided for each low-pressure accumulator 258 or 260, the suction side of which is connected to the low-pressure accumulator 258 or 260 and the delivery side of which is connected to the output pressure connection 309 or 311. Pressurizing medium can be actively recirculated from the low-pressure accumulator 258, 260 by means of the pump 270a, 270b.

Since the second brake control device 70 of the exemplary brake system of FIG. 6 is constructed for actively applying pressure to all wheel brakes 8-11, the wheel brakes 9, 11 do not have to be designed to be electrically actuable. It is correspondingly possible to omit the control lines 601, 602 of FIG. 5.

Figure 7:
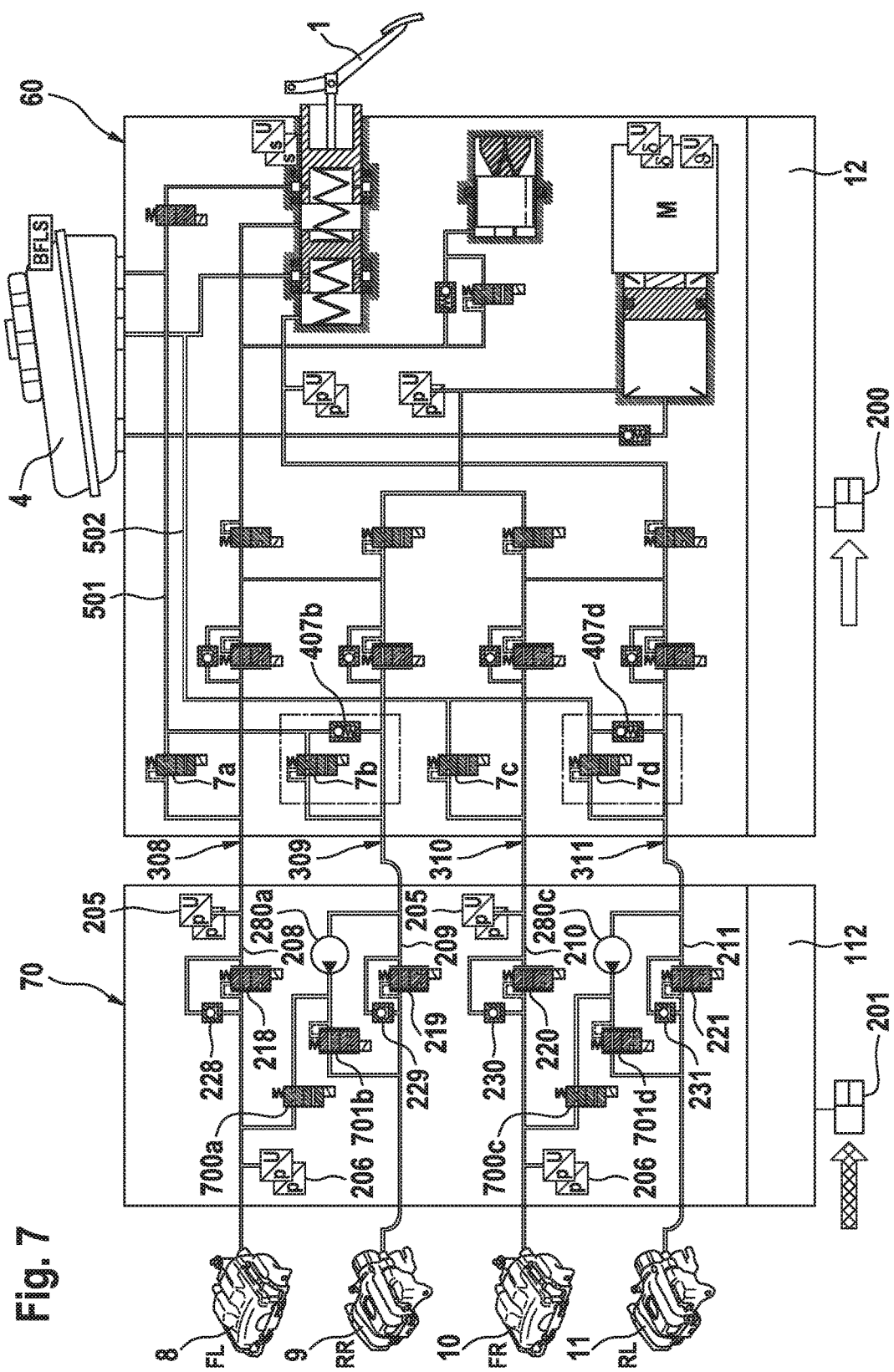
FIG. 7 a seventh exemplary embodiment of a brake system according to the invention.

A seventh exemplary embodiment of a brake system according to the invention is illustrated in FIG. 7. The first brake control device 60 essentially corresponds to that of the first exemplary embodiment of FIG. 1, although a respective non-return valve 407b or 407d is only provided for the outlet valves 7b and 7d here, which non-return valve is connected in parallel with the outlet valve.

For each of the wheel brakes 8-11, the second brake control device 70 comprises a hydraulic connecting line 208-211 for connecting the corresponding output pressure connection 308-311 to the corresponding wheel brake 8-11. An electrically actuable isolation valve 218-221 is arranged in each connecting line 208-211. The isolation valve 218-221 is designed to be normally open. By way of example, the isolation valve 218-221 is analog controllable. A respective non-return valve 228-231 which opens in the direction of the wheel brake is connected in parallel with the isolation valve 218-221.

For the connecting lines 208 and 210, the exemplary second brake control device 70 comprises a respective first pressure sensor 205 and second pressure sensor 206, wherein, in each case, the pressure sensor 205 detects the pressure upstream of the isolation valve 218, 220 (corresponds to the pressure of the output pressure connection 308 or 310) and the pressure sensor 206 detects the pressure downstream of the isolation valve 218, 220 (corresponds to the pressure of the wheel brake 8 or 10).

A pump 280a, 280c is provided for each brake circuit I, II (i.e. each wheel brake pair 8, 9 and 10, 11). By way of example, the pumps are driven together by an electric motor (not illustrated). The suction side of the pump 280a or 280c is connected to the output pressure connection 309 or 311 of the first brake control device 60, for which a non-return valve 407b, 407d is provided in the first brake control device 60.

The delivery side of the pump 280a (or 280c) is connected, on the one hand, via an electrically actuable valve 701b (or 701d) to the output pressure connection of the second brake control device 70 which corresponds to the output pressure connection 309 (or 311), (i.e. to the wheel brake 9 (or 11) for which a non-return valve 407b (or 407d) is provided in the first brake control device 60), and connected, on the other hand, via an electrically actuable valve 700a (or 700c) to the output pressure connection of the second brake control device 70, which corresponds to the other wheel brake of the brake circuit I, II, (i.e. to the wheel brake 8 (or 10) for which a non-return valve 407 is not provided in the first brake control device 60).

The valve 701b, 701d is designed to be normally open. By way of example, the valve 701b, 701d is designed as an analog controllable valve. The valve 700a, 700c is designed to be normally closed.

The exemplary brake system enables individual pressure adjustment for the four wheel brakes 8-11 by means of only two pumps 280a, 280c.

Figure 8:
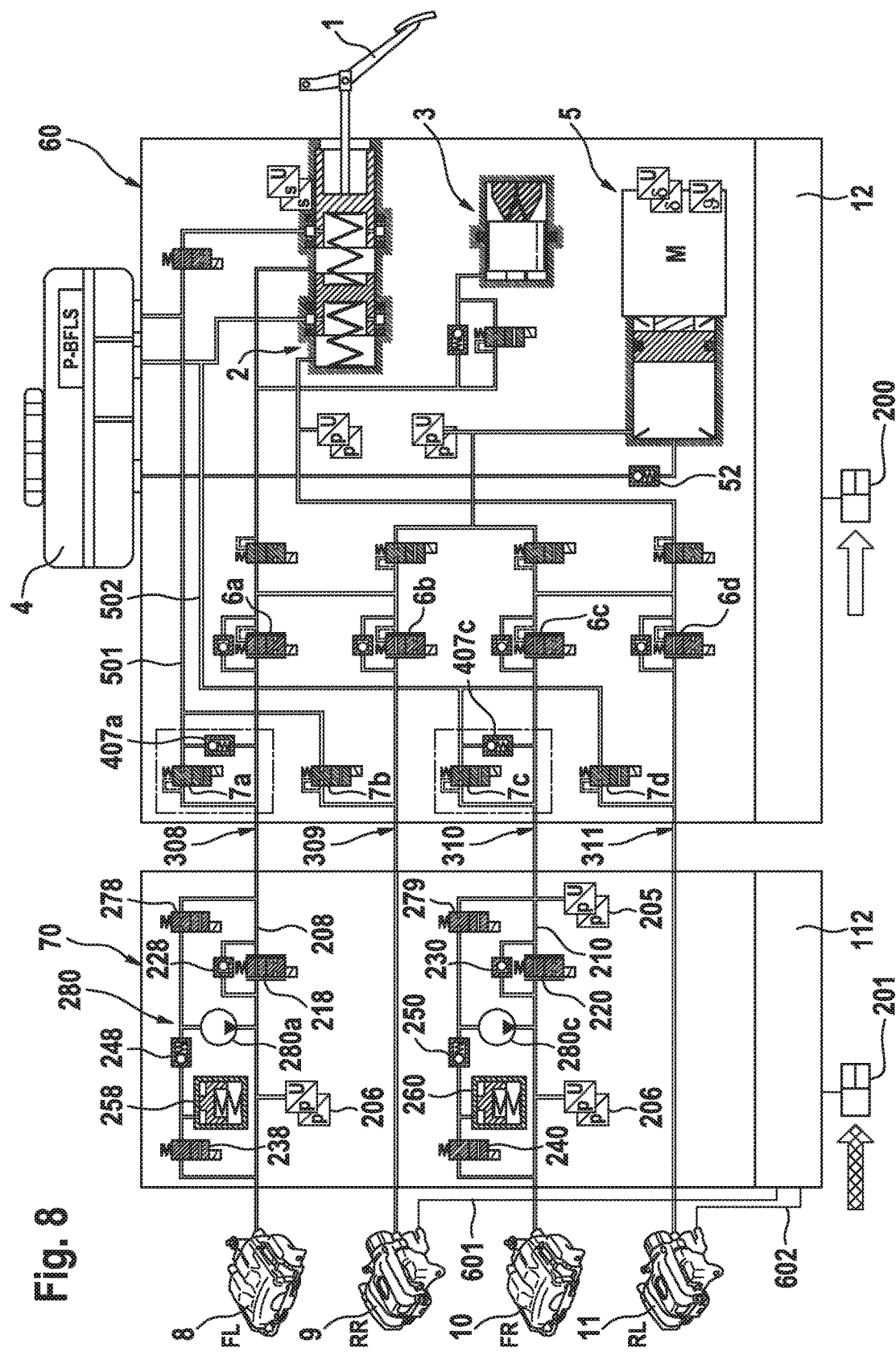
FIG. 8 an eighth exemplary embodiment of a brake system according to the invention.

An eighth exemplary embodiment of a brake system according to the invention is illustrated in FIG. 8. The first brake control device 60 corresponds to that of the first exemplary embodiment of FIG. 1.

For each of the wheel brakes 8 and 10, to which pressure can also be applied by means of the second pressure-providing device 280, the second brake control device 70 of the eighth exemplary embodiment comprises a hydraulic connecting line 208 or 210 for the connection between the output pressure connection 308, 310 and the wheel brake 8, 10, in which an electrically actuable isolation valve 218, 220 is arranged. The isolation valve 218, 220 is designed to be normally open. By way of example, the isolation valve 218, 220 is analog controllable. A non-return valve 228, 230 which opens in the direction of the wheel brake is connected in parallel with the isolation valve 218, 220.

The second brake control device 70 comprises a pump 280a, 280c for each of the wheel brakes 8 and 10. By way of example, the pumps are driven together by an electric motor (not illustrated).

The delivery side of the pump 280a, 280c is connected directly to the wheel brake 8, 10 by means of the wheel-brake-side connecting line portion of 208, 210. Connected to this portion is a respective pressure sensor 206 which therefore detects the pressure downstream of the isolation valve 218, 220 (corresponds to the pressure of the wheel brake 8 or 10).

A pressure sensor 205 is provided for detecting the pressure upstream of the isolation valve 220 (corresponds to the pressure of the output pressure connection 310).

On the one hand, the suction side of the pump 280a or 280c is connected to the associated output pressure connection 308 or 310 of the first brake control device 60 via an electrically actuable valve 278 or 279, which is normally closed. On the other hand, the suction side of the pump 280a or 280c is connected to a low-pressure accumulator 258 or 260 via a hydraulic connection in which a non-return valve 248 or 250, which opens in the direction of the pump suction side, is arranged.

The wheel brake 8, 10 is in turn connected to the low-pressure accumulator 258, 260 via an electrically actuable discharge valve 238, 240. The discharge valve is designed to be normally closed.

Pressurizing medium can be discharged from the wheel brake 8, 10 into a low-pressure accumulator 258, 260 by means of the discharge valve 238, 240.

Since the second brake control device 70 of the exemplary brake system of FIG. 8 is not only constructed for actively applying pressure to the wheel brakes 9 and 11, the wheel brakes 9, 11 are, by way of example, also designed to be electrically actuable, e.g. by means of an electric parking brake function. To this end, electrical control lines 601, 602 from the second electronic control and regulating unit 112 to the wheel brakes 9, 11 are provided, via which the second brake control device 70 can control the wheel brakes 9 and 11 in case the first brake control device 60 fails. In this case, pressure is applied to the wheel brakes 8, 10 by means of the second brake control device 70 and the wheel brakes 9, 11 are electrically actuated by the second brake control device 70.

The exemplary brake systems (HAD brake systems (HAD: Highly Automated Driving)) of FIGS. 1 to 8 each comprise essentially four hydraulically actuable wheel brakes 8, 9, 10, 11, a pressurizing-medium reservoir 4 under atmospheric pressure, a first electrohydraulic brake control device 60 (so-called master brake module) which comprises a first electrically controllable pressure-providing device 5, a pressure-regulating valve arrangement having wheel-specific inlet valves 6a-6d and outlet valves 7a-7d for adjusting wheel-specific braking pressures and a wheel-specific output pressure connection 308-311 for each wheel brake, and a second electrohydraulic brake control device 70 (so-called backup module), which comprises a second electrically controllable pressure-providing device 280 and a second pressure-regulating valve device. For at least one group of wheel brakes, the second electrohydraulic brake control device 70 here is (operatively) connected in series between the associated output pressure connections of the first brake control device 60 and the wheel brakes of the group of wheel brakes. By way of example, the group comprises two or four wheel brakes.

By way of example, the wheel brakes 8 and 10 in FIGS. 1 to 8 are associated with the left front wheel FL and the right front wheel FR, and the wheel brakes 9 and 11 are associated with the right rear wheel RR and the left front wheel RL.

A separate reservoir connection for connecting to the pressurizing-medium reservoir 4 is not provided at the second brake control device 70.

The second brake control device 70 draws pressurizing medium from the pressurizing-medium reservoir 4 through the first brake control device 60 (via the corresponding output pressure connections of the first brake control device 60).

The brake control device 60 is designed as an independent structural unit or a module, e.g. as a brake control device having an electronic control and regulating unit 12 (ECU) and a hydraulic control and regulating unit (HCU).

The brake control device 70 is designed as an independent structural unit or a module, e.g. as a brake control device having an electronic control and regulating unit 12 (ECU) and a hydraulic control and regulating unit (HCU).

By way of example, as a brake system for vehicles having an autopilot driving function, a brake system having a first brake control device 60 is proposed, which is supplemented by a backup module 70 (second brake control device) hydraulically connected downstream. This backup module used as a secondary brake system takes over the braking function if the primary brake system (first brake control device 60) fails.

The secondary brake system requires a corresponding pressurizing-medium volume for a hydraulic build up of pressure in the connected wheel brakes. To avoid the complexity of a pressurizing-medium reservoir for a secondary brake system or a (separate) pressurizing-medium supply line from the pressurizing-medium reservoir 4 of the primary brake system to the secondary brake system, it is proposed by way of example that the secondary brake system draws its required pressurizing-medium volume from the pressurizing-medium reservoir 4 of the primary brake system through the primary brake system.

Since the flow which is drawn through a primary brake system which is known per se has to pass through at least one, often two or three, solenoid valves with a small opening cross-section, the known primary brake system has such a high hydraulic suction resistance that it is not possible to create a satisfactorily dynamic build-up of pressure with the backup module connected downstream.

It is therefore proposed by way of example to alter the primary brake system such that, for each suction path of the backup module, a non-return valve 407 which opens in opposition to the outlet direction is connected in parallel with the corresponding outlet valve 7 of the primary brake system.

When pressurizing medium is drawn through the backup module 70, these non-return valves open and therefore enable a volumetric suction flow from the pressurizing-medium reservoir 4 of the primary brake system to the pumps of the backup module 70, which is not throttled by passing through a solenoid valve.

In a manner which is known per se, the non-return valves 407 can be integrated in the valve cores of the outlet valves 7. Therefore, it is not necessary to arrange bores or channels for the non-return valves in the valve block of the primary brake system.

By way of example, it is further proposed that the common return line of all outlet valves to the pressurizing-medium reservoir 4, which is present in known primary brake systems, be divided into two separate connecting lines 501, 502 to the corresponding reservoir chambers in accordance with the two-circuit construction of the hydraulics. Therefore, during operation of the backup module 70, a leak in one brake circuit I, II does not automatically result in a loss of pressurizing medium in the other brake circuit.

In the exemplary embodiments of FIGS. 1, 2, 5, 8, the secondary brake system (backup module) actuates the (front) wheel brakes 8, 10 hydraulically (by means of the pumps 280a, 280c) and the (rear) wheel brakes 9, 11 electrically (e.g. by means of an electrical control 601, 602 of the electric parking brake function of the wheel brakes 9, 11).

Electric parking brakes (EPBs) which are known per se act on the wheels of the rear axle to generate a suitable braking effect. To this end electromechanically driven combined brake calipers (which are known per se) can be used, in which, for each wheel brake, a hydraulically and an electromotively generated clamping-force act together on a pair of brake pads. For example, a spindle drive (e.g. a ball-type linear drive) is driven here by an electric motor via a primary gear, which spindle drive exerts an axial force on the brake piston in the brake caliper. By means of this force on the brake piston, the brake pads of the brake caliper are pressed against the brake disk and thus generate a frictional braking force. It is alternatively possible to use separate parking brakes which are not combined with the hydraulic service brake.

In the exemplary embodiments of FIGS. 3, 4, 6, 7, the secondary brake system actuates the wheel brakes 8-11 of both axles hydraulically (by means of the second pressure-providing device 280).

The following applies to the backup function for autopilot braking actions of the exemplary brake system of FIG. 1: front axle brakes 8, 10 actuated hydraulically; rear axle brakes 9, 11 electrically; electronic anti-locking; and passive recirculation, via non-return valves 248 and 250, of the pressurizing-medium volume which is temporarily stored in the low-pressure accumulators.

The following applies to the backup function for autopilot braking actions of the exemplary brake system of FIG. 2: front axle brakes 8, 10 actuated hydraulically; rear axle brakes 9, 11 electrically; electronic anti-locking; and active recirculation by means of pumps 270a, 270b.

The following applies to the backup function for autopilot braking actions of the exemplary brake system of FIG. 3: front axle brakes 8, 10 and rear axle brakes 9, 11 actuated hydraulically; electronic anti-locking; and passive recirculation via non-return valves 248 and 250.

The following applies to the backup function for autopilot braking actions of the exemplary brake system of FIG. 4: front axle brakes 8, 10 and rear axle brakes 9, 11 actuated hydraulically; electronic anti-locking; and active recirculation by means of pumps 270a, 270b.

The following applies to the backup function for autopilot braking actions of the exemplary brake system of FIG. 5: front axle brakes 8, 10 actuated hydraulically; rear axle brakes 9, 11 electrically; electronic anti-locking; passive recirculation via non-return valves 248 and 250; and backup module having a low flow resistance owing to hydraulically actuable isolation valves 218', 220'.

The following applies to the backup function for autopilot braking actions of the exemplary brake system of FIG. 6: front axle brakes 8, 10 and rear axle brakes 9, 11 actuated hydraulically; electronic anti-locking; active recirculation by means of pumps 270a, 270b; and backup module having a low flow resistance owing to hydraulically actuable isolation valves 218', 220'.

The following applies to the backup function for autopilot braking actions of the exemplary brake system of FIG. 7: electrohydraulic reinforcement; electronic anti-locking; and active recirculation by means of pumps 270a and 270b.

The following applies to the backup function for autopilot braking actions of the exemplary brake system of FIG. 8: front axle brakes 8, 10 and rear axle brakes 9, 11 actuated hydraulically; electronic anti-locking; and individual pressure adjustment for four wheel brakes by means of only two pumps.

In FIGS. 1, 2, 5, 8, the wheel brakes 9 and 11 are connected to the output pressure connections 309, 311 of the first brake control device via/by the second brake control device 70. In the second brake control device 70, however, no hydraulic components, in particular no pump or valve, is provided for these wheel brakes. As an alternative to the exemplary brake systems illustrated, the wheel brakes 9 and 11 can therefore also be connected directly to the output pressure connections 309, 311, i.e. not via/by means of the second brake control device 70.

To increase the availability, at least two independent electrical energy supplies 200, 201 are provided in the brake systems of FIGS. 1 to 8. For example, the brake control device 60 is supplied by a first electrical energy supply 200 and the brake control device 70 is supplied by a second electrical energy supply 201.

In the exemplary brake systems, a pressurizing-medium supply to the backup module via a suction line arranged separately from the hydraulic pressure lines (308, 309, 310, 311) is not provided and nor is it necessary. Such a suction line would involve additional complexity and constitutes a potential error source for the functioning of the brake system due to the possible drawing-in of an air bubble which may be present in said suction line, which would cause the brake system hydraulics to fail.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A brake system for motor vehicles comprising:
   hydraulically actuable wheel brakes;
   a first electrohydraulic brake control device having a pressurizing-medium reservoir, wherein the pressurizing-medium reservoir is under atmospheric pressure;
   the first electrohydraulic brake control device comprising;
      a first electrically controllable pressure-providing device for supplying the hydraulically actuable wheel brakes;
      an electrically actuable inlet valve for each of the hydraulically actuable wheel brakes;
      an electrically actuable outlet valve for adjusting wheel-specific braking pressures; and
      a wheel-specific output pressure connection for each of the hydraulically actuable wheel brakes, wherein the output pressure connections are connected to the pressurizing-medium reservoir via the outlet valves;
   a second electrohydraulic brake control device comprises
      a second electrically controllable pressure-providing device, the second electrically controllable pressure-providing device comprising
      at least a first pump having a suction side and a delivery side for supplying at least a first wheel brake of the hydraulically actuable wheel brakes; and
   wherein the second electrohydraulic brake control device is connected downstream of the first electrohydraulic brake control device and the suction side of the first pump is connected to a first output pressure connection of the output pressure connections of the first electrohydraulic brake control device, wherein a non-return valve which opens in the direction of the first output pressure connection is connected in parallel with the outlet valve associated with the first output pressure connection.

2. The brake system of claim 1, wherein the parallel-connected non-return valve is integrated in a valve core of the corresponding outlet valve.

3. The brake system of claim 1, wherein the second pressure-providing device further comprises:
   a second pump having a suction side and a delivery side for supplying at least a second wheel brake of the hydraulically actuable wheel brakes; and
   wherein the suction side of the second pump is connected to a second output pressure connection of the output pressure connections of the first electrohydraulic brake control device, wherein a non-return valve which opens in the direction of the second output pressure connection is connected in parallel with the outlet valve associated with the second output pressure connection.

4. The brake system of claim 3, wherein the first and the second wheel brake are associated with a front axle of the motor vehicle.

5. The brake system of claim 4, wherein the second electrohydraulic brake control device is constructed for regulating the brake pressures of the wheel brakes of the front axle on the basis of wheel-speed information of all wheels of the motor vehicle, input-pressure information of the second electrohydraulic brake control device and an electronic braking request.

6. The brake system of claim 5, wherein the wheels of the rear axle are designed with one of: electrically actuable wheel brakes, electromechanically actuable wheel brakes, electric parking brakes, or with brakes, which can be controlled both hydraulically and electrically, wherein the second electrohydraulic brake control device is constructed for electrically actuating both the electric wheel brakes and electromechanical wheel brakes.

7. The brake system of claim 3, wherein the second electrohydraulic brake control device comprises a respective low-pressure accumulator for the first and the second pump, wherein the suction side of the first and second pump is connected to the respective low-pressure accumulator via a non-return valve which opens in the direction of the suction side.

8. The brake system of claim 7, wherein the second electrohydraulic brake control device comprises a respective discharge valve for the first and the second pump, which is normally closed, wherein the wheel brake associated with the first and second pump is connected to the respective low-pressure accumulator via the respective discharge valve.

9. The brake system of claim 3, wherein the second electrohydraulic brake control device comprises a respective connecting valve for the first and the second pump, which is be normally closed and via which the suction side of the respective first and second pump is connected to the associated output pressure connection of the first brake control device.

10. The brake system of claim 3, wherein the second pressure-providing device further comprises:
   a third pump having a suction side and a delivery side for supplying a third wheel brake of the hydraulically actuable wheel brakes;
   a fourth pump having a suction side and a delivery side for supplying a fourth wheel brake of the hydraulically actuable wheel brakes;
   wherein the suction side of the third pump is connected to a third output pressure connection of the output pressure connections of the first electrohydraulic brake control device;
   wherein the suction side of the fourth pump is connected to a fourth output pressure connection of the output pressure connections of the first electrohydraulic brake control device; and
   wherein a respective non-return valve which opens in the direction of the corresponding output pressure connection is connected in parallel with the outlet valve associated with the third output pressure connection and the outlet valve associated with the fourth output pressure connection.

11. The brake system of claim 3, wherein the delivery side of the first pump is connected to the first wheel brake and a third wheel brake of the hydraulically actuable wheel brakes and the delivery side of the second pump is connected to the second wheel brake and a fourth wheel brake of the hydraulically actuable wheel brakes.

12. The brake system of claim 1, wherein the outlet valves of the first electrohydraulic brake control device are connected to chambers of the pressurizing-medium reservoir via at least two mutually independent return lines.

13. The brake system of claim 12, wherein one of the return lines is connected to two of the outlet valves in each case, and wherein the hydraulically actuable wheel brakes belonging to the two outlet valves are connected to the same pressure chamber of a tandem master brake cylinder of the first electrohydraulic brake control device.

* * * * *